(12) United States Patent
Aisu et al.

(10) Patent No.: US 9,740,545 B2
(45) Date of Patent: Aug. 22, 2017

(54) EQUIPMENT EVALUATION DEVICE, EQUIPMENT EVALUATION METHOD AND NON-TRANSITORY COMPUTER READABLE MEDIUM

(71) Applicant: KABUSHIKI KAISHA TOSHIBA, Tokyo (JP)

(72) Inventors: Hideyuki Aisu, Kanagawa (JP); Toshimitsu Kumazawa, Kanagawa (JP); Mitsunobu Yoshida, Kanagawa (JP); Mikito Iwamasa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/068,120

(22) Filed: Mar. 11, 2016

(65) Prior Publication Data
US 2016/0274963 A1    Sep. 22, 2016

(30) Foreign Application Priority Data

Mar. 20, 2015    (JP) .................................. 2015-058701

(51) Int. Cl.
*G06F 11/00*    (2006.01)
(52) U.S. Cl.
CPC .................................. *G06F 11/008* (2013.01)
(58) Field of Classification Search
USPC ........................................................ 714/37.1
See application file for complete search history.

(56) References Cited

U.S. PATENT DOCUMENTS

| 2011/0113288 A1* | 5/2011 | Ramakrishnan .... G06F 11/3684 |
| | | 714/38.1 |
| 2012/0041575 A1 | 2/2012 | Maeda et al. |

(Continued)

FOREIGN PATENT DOCUMENTS

| JP | 5-108667 | 4/1993 |
| JP | 6-44421 | 2/1996 |

(Continued)

OTHER PUBLICATIONS

Office of Energy Efficiency & Renewable Energy. (Apr. 14, 2016). "Commercial Reference Buildings," located at <www.energycodes.gov/commercial-prototype-building-models.html> visited on May 10, 2016. (6 pages).

*Primary Examiner* — Sarai Butler
(74) *Attorney, Agent, or Firm* — Finnegan, Henderson, Farabow, Garrett & Dunner, L.L.P.

(57) ABSTRACT

According to one embodiment, an equipment evaluation system includes: an estimator, an acquirer, a hardware storage and an evaluator. The estimator is implemented by the computer, to estimate a probability density distribution of a parameter representing performance of subject equipment based on measurement data of the subject equipment, the measurement data resulting from a measurement performed at each of a plurality of times. The acquirer acquires a use pattern of the subject equipment. The hardware storage stores the use pattern in association with the probability density distribution for the subject equipment. The evaluator identifies a use pattern of the subject equipment, the use pattern being similar to a use pattern of a first equipment that is different from the subject equipment, and evaluates future performance degradation of the first equipment using probability density distributions corresponding to the identified use pattern.

7 Claims, 9 Drawing Sheets

(56) References Cited

U.S. PATENT DOCUMENTS

| | | | |
|---|---|---|---|
| 2013/0197854 A1* | 8/2013 | Liao | G06F 17/18 |
| | | | 702/130 |
| 2013/0262190 A1 | 10/2013 | Sato et al. | |
| 2014/0359376 A1* | 12/2014 | Fahimi | G06F 11/0751 |
| | | | 714/48 |

FOREIGN PATENT DOCUMENTS

| | | |
|---|---|---|
| JP | 2001-338016 | 12/2001 |
| JP | 2005-182558 | 7/2005 |
| JP | 2009-3502 | 1/2009 |
| JP | 2010-191556 | 9/2010 |
| JP | 2011-99753 | 5/2011 |
| JP | 2013-152656 | 8/2013 |
| JP | 2013-205964 | 10/2013 |
| JP | 2014-139774 | 7/2014 |
| WO | WO-2011/055718 | 5/2011 |
| WO | WO-2013/111397 | 8/2013 |

* cited by examiner

F I G. 1

MONDAY, MARCH 10, 2014  OUTDOOR TEMPERATURE: 12°C  SUNNY WEATHER

ESTIMATED PROBABILITY DENSITY DISTRIBUTION

EQUIPMENT EVALUATION DEVICE, EQUIPMENT EVALUATION METHOD AND NON-TRANSITORY COMPUTER READABLE MEDIUM

CROSS-REFERENCE TO RELATED APPLICATIONS

This application is based upon and claims the benefit of priority from Japanese Patent Application No. 2015-058701, filed Mar. 20, 2015; the entire contents of which are incorporated herein by reference.

FIELD

Embodiments described herein relates to an equipment evaluation device, an equipment evaluation method and a non-transitory computer readable medium.

BACKGROUND

A movement of connecting many customers such as collective housings, buildings and plants collectively via the Internet and providing various services in monitoring, control and diagnosis of facilities, which have conventionally been performed on site, remotely via a could have been becoming active. Also, with increase of old building stocks, there is a tendency of increasing the demand for replacement of electrical equipment accompanying remodeling, renovation and retrofit.

In remote monitoring, ordinarily, there are no persons in charge of managing the system on-site. It is necessary to maintain the levels of the services by performing consistently monitoring to promptly find failures and performance degradation of equipment (devices and the like) and sensors that affect the behavior of the facility, remotely at low engineering costs. Also, in construction machines, medical devices, power generation equipment using, e.g., wind power, solar power or thermal power, equipment for water treatment and plants, periodic maintenance is important in order to prevent decrease in operation rate due to occurrence of equipment malfunction. However, even though periodic maintenance is performed, the risk of the equipment going down because of a failure is unavoidable, and thus, early detection (sign detection) of abnormalities and early identification (diagnosis) of abnormal parts based on measurement data from sensors added to the equipment have been becoming important.

As facility maintenance methods, e.g., a technique that assists developing a proper replacement plan for a replacement timing according to a useful life (referred to as Technique 1) and a technique that proposes equipment improvement necessary for meeting a need, to an existing equipment (referred to as Technique 2) have been proposed so far. These techniques focus primarily on preparing an optimum equipment replacement plan for a certain point of time, and is not intended to prepare a long-term improvement plan taking, e.g., deterioration of an equipment.

Also, assumed that ways of change in deterioration and failure of equipment relative to time are provided in the form of data and/or mathematical expressions, a technique using dynamic programming (referred to as Technique 3), e.g., has been proposed as PV equipment replacement planning methods. This technique is applicable to, e.g., a plan for maintenance of a facility.

Also, as a method using sensor data and/or history data of equipment inspections that can be obtained online, there is a technique that evaluates a remaining useful life for a lithium-ion battery (referred to as Technique 4). Also, a technique that learns a possibility of deterioration and failure (abnormality degree) of equipment relative to time for a plant to estimate further progress of the abnormality degree and thereby evaluates time during which the equipment can continue operating (referred to as Technique 5) has been proposed.

The methods of Techniques 1 and 2 focus primarily on preparing an optimum equipment replacement plan for a certain point of time and are not intended to prepare a long-term improvement plan. Since many electrical equipment devices in buildings operate for a long period of time, it is necessary to, utilizing data collected from the buildings, predict change in use pattern and performance degradation states of the devices over a long period of time in consideration of the entire life cycles and prepare an improvement plan utilizing results of the prediction.

Also, a method such Technique 3, which is premised on ways of change in deterioration and failure of an equipment relative to time being provided in advance in the form of data and/or mathematical expressions, is difficult to be applied to complicated systems such as building facilities and plants in which ways of deterioration and change in failure largely vary depending on the usage of the equipment.

On the other hand, for a method using sensor data and/or history data of equipment inspections, which can be obtained online, also, the methods such as Techniques 4 and 5 require modeling by means of actual measurement of deterioration and a failure rate of an equipment relative to time according to actual inspections in past similar cases and previous tests. However, collecting a large amount of actual measurement values of deterioration and failures requires long-term observation and thus is difficult.

DETAILED DESCRIPTION

According to one embodiment, an equipment evaluation system comprising a computer including a processor is provided.

The equipment evaluation system an estimator, an acquirer, a hardware storage and an evaluator, which are implemented by a computer.

The estimator estimates a probability density distribution of a parameter representing performance of subject equipment based on measurement data of the subject equipment, the measurement data resulting from a measurement performed at each of a plurality of times. The acquirer acquires a use pattern of the subject equipment. The hardware storage stores the use pattern in association with the probability density distribution for the subject equipment. The evaluator identifies a use pattern of the subject equipment, the use pattern being similar to a use pattern of a first equipment that is different from the subject equipment, and evaluates future performance degradation of the first equipment using probability density distributions corresponding to the identified use pattern.

Hereinafter, the embodiments will be described with the accompanying drawings.

Figure 1:
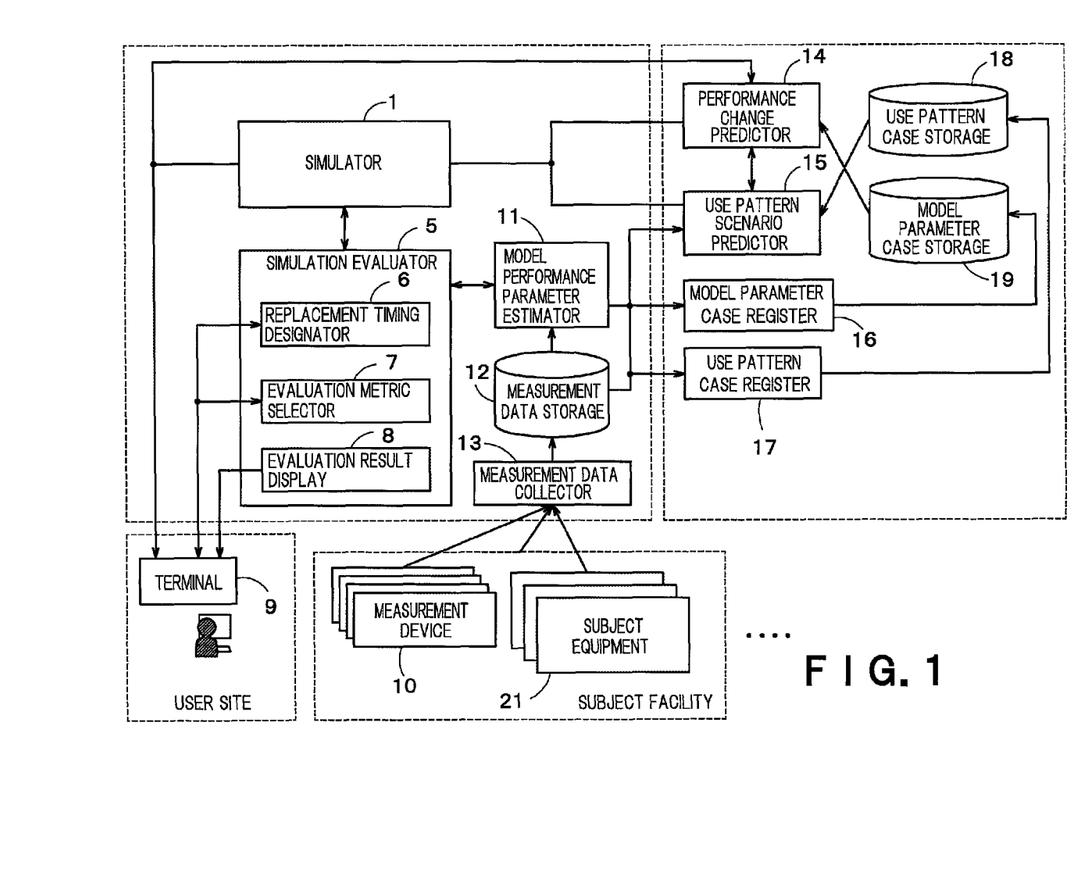
FIG. 1 is a diagram illustrating a configuration of an equipment evaluation system according to an embodiment of the present invention.

FIG. 1 is a diagram illustrating a configuration of an equipment evaluation system according to an embodiment of the present invention.

The equipment evaluation system in FIG. 1 includes a simulator 1, a simulation evaluator 5, a model performance parameter estimator 11, a measurement data storage 12, a measurement data collector 13, a performance change predictor 14, a use pattern scenario predictor 15, a model parameter case register 16, a use pattern case register 17, a use pattern case storage 18 and a model parameter case storage 19.

The system is connected to a terminal 9 of a user site via a network. Also, the system is connected to communication devices in one or more subject facilities via a network. The subject facilities are premises or establishments such as buildings or plants. In each subject facility, a plurality of subject equipment 21 and sensors (measurement devices) 10 monitoring the plurality of subject equipment 21 are disposed. At least one of the plurality of subject equipment 21 includes subject equipment that is subject to evaluation.

The measurement data collector 13 collects measurement data from the subject equipment 21 and the sensors (measurement devices) 10 via a communication network. The subject equipment 21 and the sensors (measurement devices) 10 transmit the measurement data via the communication devices in the subject facility. The measurement data may include one or more measurement items. Also, no data of a measurement item that is not necessary for diagnosis of the subject equipment 21 needs to be included. Any of a configuration in which measurement data are acquired from both the subject equipment 21 and the sensors 10, a configuration in which measurement data is acquired from the sensors 10 only and a configuration in which measurement data is acquired from the subject equipment 21 only is possible. The subject equipment 21 may be any equipment such as devices including an air-conditioning equipment, a lighting equipment, a power supply equipment and a water supply equipment and a solar panel.

The measurement data acquired from each subject equipment 21 may be any data that can be measured in the subject equipment 21. For example, in the case of an air-conditioning equipment, the measurement data include logs e.g., a set temperature, power consumption, control signals and errors. The measurement data acquired from each sensor 10 may be any data that can be measured by the sensor 10. For example, in the case of an air-conditioning equipment, the measurement data include, e.g., a temperature and a humidity of a room in which the sensor 10 is installed, a flow rate of water flowing to/from a heat exchanger and sound of operation of temperature equipment. The measurement data collector 13 may acquire the measurement data at an arbitrary timing by means of polling. Or the subject equipment 21 and the sensor 10 may transmit the measurement data to the measurement data collector 13 at an arbitrary timing. The measurement data transmitted from the subject equipment 21 and the sensor 10 may include information identifying, e.g., either or both of a model number and a model of the subject equipment 21.

The measurement data storage 12 stores, therein, the measurement data collected by the measurement data collector 13.

The simulator 1 corresponds to a program or hardware for performing a computational simulation of an equipment inside the subject facility. The simulator 1 performs a simulation according to an instruction from the simulation evaluator 5 or the model performance parameter estimator 11. It is assumed that a content and method of computation by the simulator 1 are determined in advance by, e.g., a model formula (state equation). Parameters necessary for simulation may be provided from either or both of the simulation evaluator and the model performance parameter estimator 11. Here, for the simulator 1, an existing simulator may be used.

Figure 2:
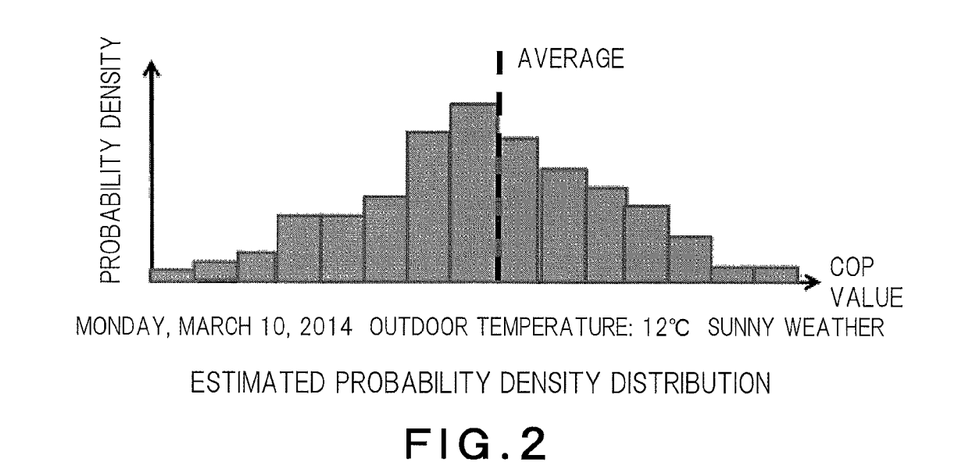
FIG. 2 is a diagram illustrating an example of a probability density distribution of a COP.

The model performance parameter estimator 11 performs a simulation using the simulator 1 via the simulation evaluator 5. More specifically, for each of a plurality of times, a probability density distribution of a parameter representing performance of subject equipment is estimated based on measurement data that has been acquired up to the time. As an example, the parameter is a coefficient used as a part of a numerical model when numerical operation is performed in the simulator 1, which is a value that cannot be measured directly from the subject equipment. For example, if the subject equipment is an air-conditioning equipment in a building, a parameter to be estimated can be, e.g., heat insulation performance of walls, a coefficient of performance (COP) for cooling/heating in each room relative to energy provided to the air-conditioning equipment or an expected amount of heat generated by humans. Such parameter is estimated by the estimator 11 as a probability density distribution. The item of the parameter to be estimated may be determined in advance or may be designated by the user from a user site via an input device of a terminal 9. Also, there may be one or more parameters to be estimated. FIG. 2 is an example of a probability density distribution in the case where a COP is used as a parameter.

Here, for estimation of the parameter, Bayesian estimation can be used. Where Y is a measured state that is based on measurement data, and X is a non-measured state, estimating the state X based on the state Y is equivalent to calculating a probability (posterior probability) P(X|Y) of occurrence of the state X in the case where the state Y occurs. The posterior probability P(X|Y) can be expressed as the following expression according to Bayes' theorem.

$$P(X|Y) = \frac{P(Y|X)P(X)}{P(Y)} \quad \text{[Expression 1]}$$

In Bayesian estimation, in the above expression, X is a random variable and X is a parameter in a probability density function P. Hereinafter, X is referred to as an estimation parameter. Then, P(X) is a prior probability density distribution of the estimation parameter X, and P(X|Y) is a posterior probability density distribution of the estimation parameter X when the state Y was measured. P(Y) is a prior probability of occurrence of the state Y. P(Y|X) is a posterior probability of provision of Y at the parameter X, which is referred to as "likelihood".

Furthermore, where Xt is an estimation parameter at a time t (t is a positive real number), Expression 1 may be substituted by the following expression.

$$P(Xt|Y1:t) = \frac{P(Yt|Xt)P(Xt|Y1:t-1)}{P(Yt|Y1:t-1)} \quad \text{[Expression 2]}$$

Y1:t means a set of data measured up to the time t, Y={Y1, Y2, . . . Yt}. In other words, P(Xt|Y1:t) means a probability density distribution of the estimation parameter X based on measurement values from a measurement start time to a current time.

If attention is focused on a shape of the probability density distribution, P(Yt|Y1:t−1) is a constant not depending on X and thus may be ignored. Accordingly, P(Yt|Y1:t−1) can be expressed by the following expression.

$$P(Xt|Y1:t) \propto P(Yt|Xt)P(Xt|Y1:t-1) \quad \text{[Expression 3]}$$

Expression 3 above means that as a result of obtaining a new measurement value Yt and calculating a likelihood P(Yt|Xt), a posterior probability density distribution P(Xt|Y1:t−1) estimated from measurement data up to a previous time t−1 can sequentially be updated to a posterior probability density distribution P(Xt|Y1:t) to be estimated from measurement data up to the current time. Accordingly, starting from an arbitrary initial probability density distribution P(X0) at an initial time t=0, repetition of calculation of the likelihood and update of the posterior probability density distribution enables obtainment of the probability density distribution of the estimation parameter X for the current time.

As described above, as methods for obtaining a posterior probability density distribution, e.g., Markov chain Monte Carlo (MCMC) methods including Gibbs methods and Metropolis methods and particle methods, the particle methods being a kind of sequential Monte Carlo methods, are known.

The model performance parameter estimator 11 calculates a posterior probability density distribution using a predetermined one of the above methods. For calculation of the likelihood P(Yt|Xt), the simulator 1 is used. The estimated posterior probability density distribution is sent to the model parameter case register 16.

Here, as an example of the model performance parameter estimator 11 estimating a posterior probability density distribution, a case using a particle filter will be described.

A particle filter is a method in which a posterior probability density distribution P(X|Y) of the estimation parameter X is approximated by a distribution in a particle group including numerous particles. In the particle filter, prediction, likelihood calculation and resampling (update of the distribution of the particles) are sequentially repeated, whereby the posterior probability density distribution of the estimation parameter X for a current time is calculated.

The number of particles may arbitrarily be determined generally within a range of around 100 to 10000. As the total number of particles is larger, the estimation accuracy is enhanced more; however, time required for the estimation calculation becomes longer. Here, where the number of particles is n (n is a positive integer), the particle group is represented by P={p1, p2, . . . , pi . . . pn}. Here, i is an integer that is not smaller than 1 and is not larger than n.

If there is a plurality of states to be estimated, the estimation parameter X can be expressed by an n-dimensional vector X={x1, x2, . . . xm} including m (m is a positive integer) components. For example, if both a COP and an expected heat generation amount per human are estimated, x1 is determined as the COP and x2 is determined as the expected heat generation amount, but other information may be included. Each particle include all pieces of information that enable calculation of a predictive value Yt+1 of each component of the particle for a time t+1 using random numbers and a predetermined model formula (state equation), with the aforementioned measurement value Yt and the components of the particle input thereto. In this case, an i-th particle can be expressed by the following expression.

$$p_i = \{x1_i, x2_i, \ldots, xm_i, \text{weight } i\}$$

A weight i is a numerical value used in processing in later-described resampling. A value and a weight of each element of a particle can be expressed by a floating point or an integer.

Figure 3:
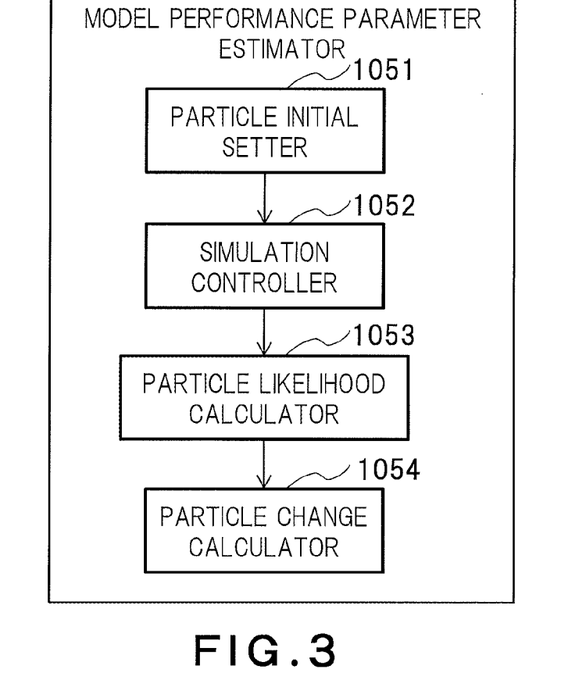
FIG. 3 is a block diagram of a model performance parameter estimator where a particle filter is used.

FIG. 3 is a block diagram illustrating an example configuration of the model performance parameter estimator 11 where a particle filter is used. The model performance parameter estimator 11 includes a particle initial setter 1051, a simulation controller 1052, a particle likelihood calculator 1053 and a particle change calculator 1054.

The particle initial setter 1051 sets initial values of a component and a weight of each particle at an initial time. It is assumed that the initial value of the component is 0 and the initial value of the weight is 1; however, the initial values may be other values. Also, the user may input the values from the terminal 9.

The simulation controller 1052 sends the values of the component and the weight of each particle to the simulator 1 and provides an instruction to perform a simulation.

The simulator 1 calculates a predictive value of the component of each particle for a time t+1 using random numbers and a predetermined model formula (state equation).

The particle likelihood calculator 1053 calculates a likelihood based on a difference between the predictive value of each particle for the time t+1, which has been calculated by the simulator 1, and an actual measurement value of measurement data at the time t+1.

Examples of the method for calculation the likelihood include, e.g., a method in which a Euclidean distance between a measurement value of measurement data and a predictive value from the simulator 1 is normalized assuming that noise based on a Gaussian distribution is contained in observation values; however, the method is not specifically limited.

The particle change calculator 1054 performs resampling with the likelihood of each particle calculated by the particle likelihood calculator 1053 as a weight value of the particle. Resampling means that each particle is replicated or eliminated based on the weight value to generate a new particle group. Here, the number of particles is constant because a number of particles, the number corresponding to the number of particles eliminated, are replicated.

In a method for resampling, based on a selection probability Ri, which is a value obtained by dividing a weight i of a particle pi by a total sum of weights of all the particles (weight i/Σ weight i), each particle is replicated or eliminated. Then, n particles existing after end of the resampling is determined as a new set of particles.

The particle change calculator 1054 changes values of components included in each section formed in advance by dividing values of all the components of all the particles in the new particle group at regular intervals, to a predetermined value in the section. This is because a value in the probability density distribution is determined by the number of particles having that value in the section. Then, the weight of each particle is set to, for example, 1. As described above, a particle group for the time t+1 is generated.

FIGS. 4A to 4E are diagrams illustrating a content of processing in a particle filter. The abscissa axis represents a random variable x1 and the ordinate axis represents a probability density.

Figure 4A:
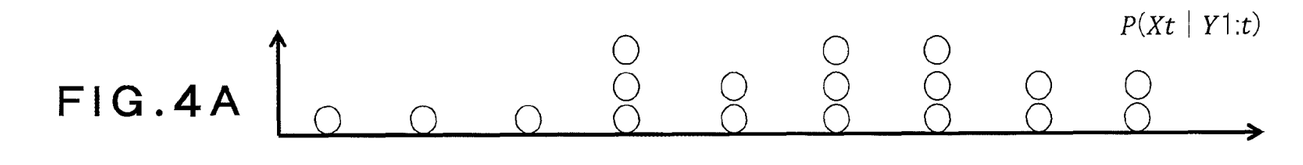
FIGS. 4A to 4E are diagrams illustrating a content of processing in a particle filter.

FIG. 4A illustrates a distribution of particles at the time t. For sake of simplicity, a particle indicated above another particle indicates that there are a plurality of particles whose values of x1 are the same.

Figure 4B:
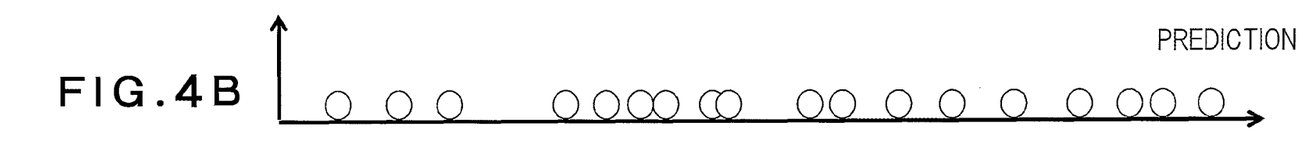

FIG. 4B is a distribution resulting from a distribution of particles at the time t+1 being predicated by a simulation.

Figures 4C, 4D, 4E:
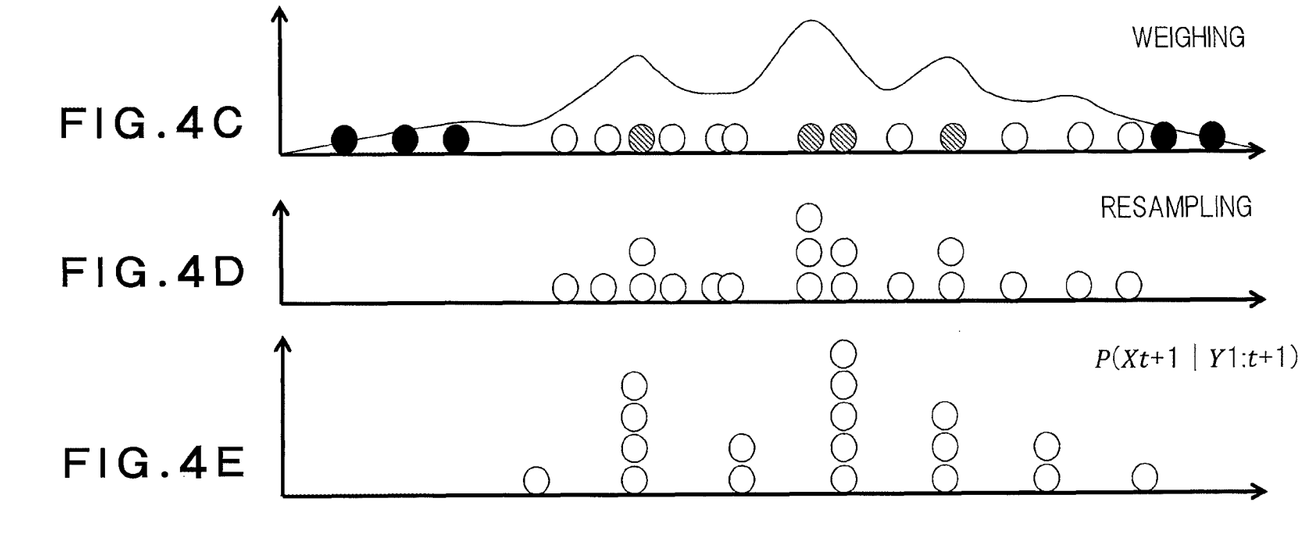

FIG. 4C indicates a likelihood graph and a distribution of particles, and marks of the respective particles are classified according to differences in weight between the particles. Based on the magnitude of the likelihood indicated by the curved line, the weight of each particle is determined. A criterion for determining whether the likelihood is large or small is determined in advance. Here, the particles having a small likelihood are blacked out, particles having a large likelihood are shaded, and the other particles are white outlined.

FIG. 4D illustrates a result of resampling. The blacked-out particles having a small likelihood have been eliminated, and the shaded particles having a large likelihood have been replicated. Here, the counts of replicas of the particles may be different depending on the weights. For example, for a particle having a largest likelihood in FIG. 4C, two replicas are generated in FIG. 4D.

FIG. 4E illustrates a distribution of particles at the time t+1. As a result of adjustment to change all of values of particles in each fixed section to a fixed value, there are a plurality of particles having a same value, providing a shape of the probability density distribution at the time t+1.

This processing is repeated up to the current time, whereby a posterior probability density distribution at the current time can be obtained finally.

Figure 5:
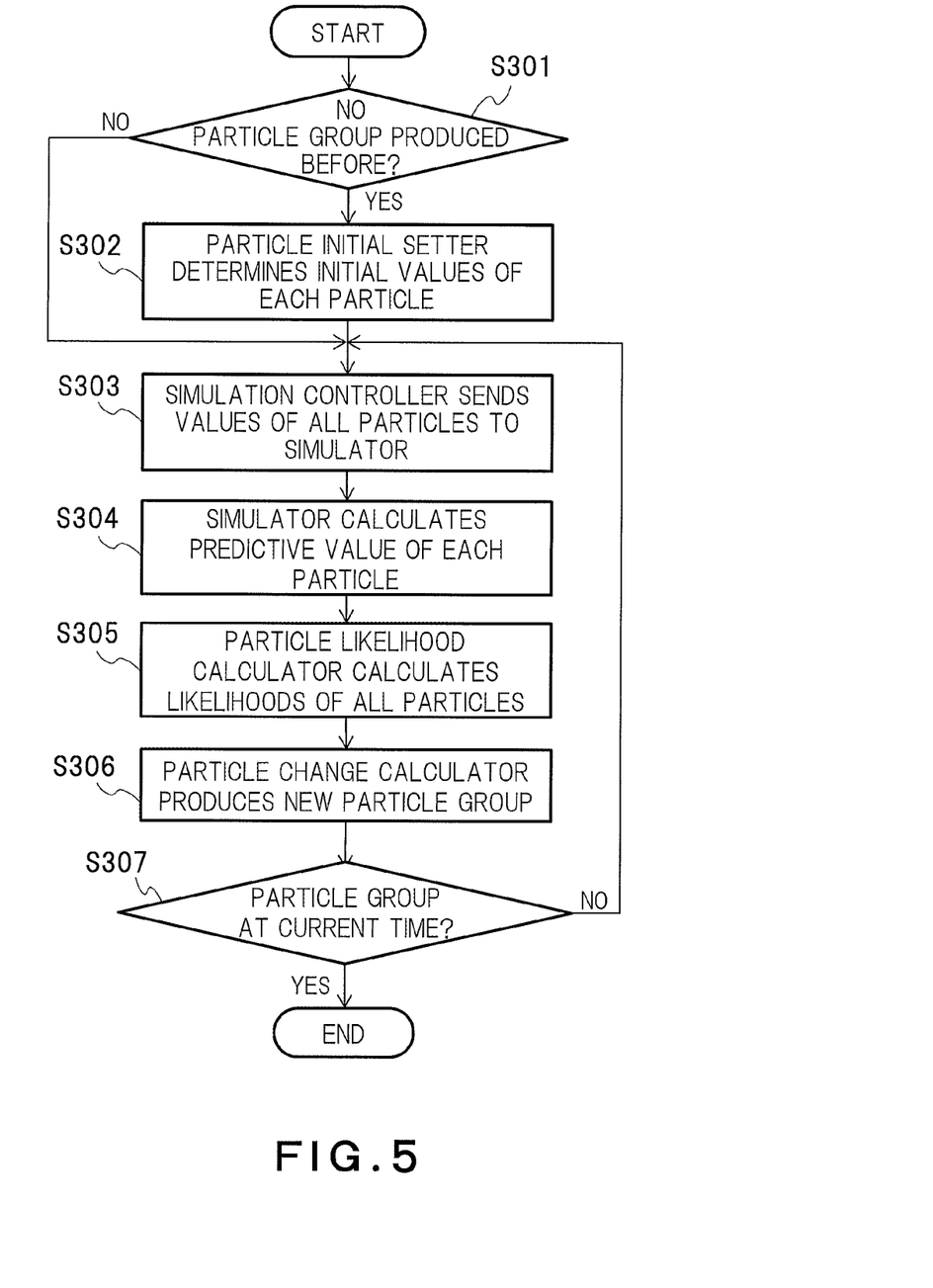
FIG. 5 is a flowchart of particle filter processing.

FIG. 5 is a flowchart of particle filter processing.

For an estimation parameter for which a probability density distribution is generated, the particle initial setter 1051 determines whether or not there is a particle group generated before (S301). If there is, the processing proceeds to processing in S303. If there is not, the particle initial setter 1051 determines initial values of each particle (S302). Although it is assumed that the number of particles is determined in advance, the number of particles may be determined by the particle initial setter 1051 in this step.

The simulation controller 1052 sends values of components of all the particles to the simulator 1 (S303). The simulator performs simulation for all the acquired particles to calculate a predictive value of each particle for a next time (S304).

The particle likelihood calculator 1053 acquires the predictive values from the simulation controller 1052 and measurement data from the measurement data storage 103 and calculates likelihoods of the respective particles based on the predictive values and the measurement data (S305).

The particle change calculator 1054 performs resampling and adjustment of the values of the respective particles to generate a new particle group (S306). Whether or not the generated new particle group is a particle group at a current time is confirmed (S307), and if the new particle group is not a particle group at the current time (NO in S307), the processing returns to processing in S303. If the new particle group is a particle group at the current time (YES in S307), the processing ends.

The model parameter case register 16 links a probability density distribution of a model performance parameter estimated by the model performance parameter estimator 11, to index information, and records this into the model parameter case storage 19 as a model parameter case. Consequently, in the model parameter case storage 19, for a same subject equipment, a plurality of probability density distributions are stored according to the times (in time series). A plurality of subject equipment may be provided, and in such case, for each subject equipment, a plurality of probability density distributions are stored in time series. Also, a plurality of subject facilities may exist. Also, times at which a probability density distribution is estimated may be times with a regular interval or may be times designated by the user via the terminal 9.

Here, examples of the index information include feature values such as a time and a date of the recording, a day, weather, a season, equipment operation time in each season, an average value of set temperatures, an average value of outdoor temperatures, a model and a model number. Also, examples of the index information include, e.g., a keyword for identifying an event affecting the subject equipment. The event may be, for example, an event that is deemed to affect the subject equipment such as replacement, inspection or repair of the subject equipment or change in layout of the site in which the equipment is placed or change of tenants. If the index information is added to the measurement data, the index information may be used. It is also possible that the user inputs the index information from the input device of the terminal and the input index information is added to the probability density distribution.

Figure 6:
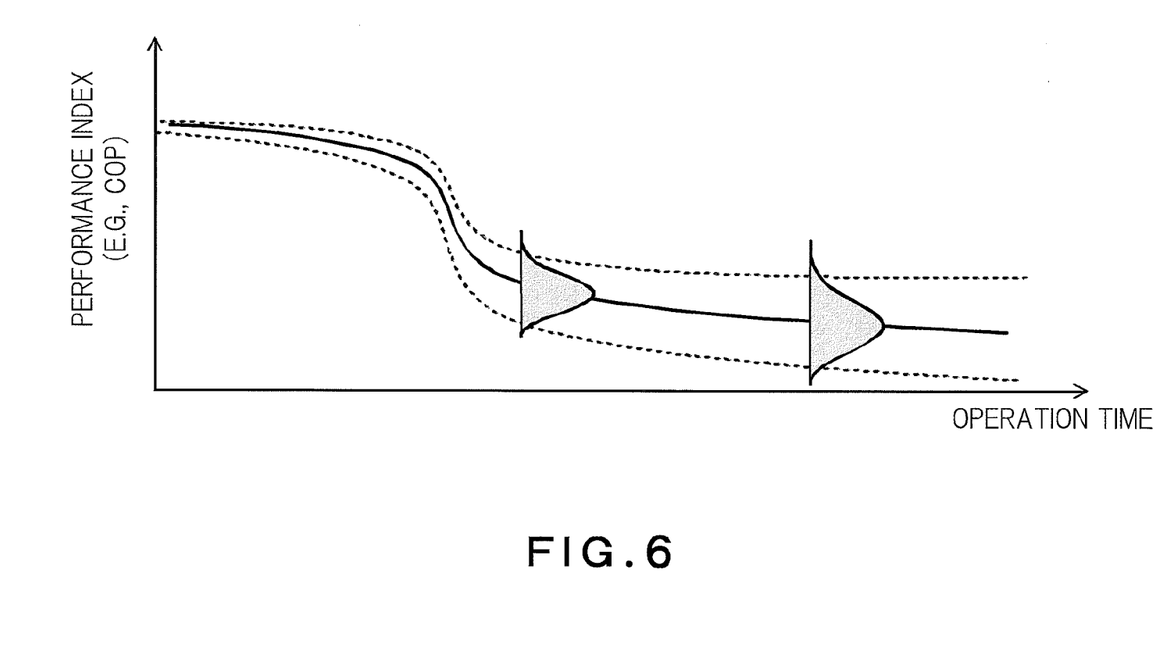
FIG. 6 is a diagram illustrating an example of a performance change pattern of an equipment.

FIG. 6 illustrates an example of a performance change pattern indicating a plurality of probability density distributions in a case recorded in the model parameter case storage 19, which are arranged in time series. The solid line represents an average of probability density distributions, the upper dashed line represents an X percent point at the top and the lower dashed line represents an X percent point at the bottom. X is a predetermined value or a value designated by the user via the terminal 9. It can be seen that variation of probability density distributions of an estimated parameter becomes larger normally along with passage of time.

The use pattern case register 17 links data indicating a usage status of subject equipment (device or the like) to index information and records the data in the use pattern case storage 18 as a use pattern case. The index information is as described above. Same index information may be provided to a model parameter case and a use pattern case. Or, index information for a model parameter case may include only minimum items necessary for association between a user pattern and a probability density distribution estimated for a same subject equipment or facility (e.g., at least one of date, model and model number) as in the example in FIG. 6. More index information may be added to a use pattern for processing in the use pattern scenario predictor 15, which will be described later.

As a specific example of the use pattern case, in the case of an air-conditioning equipment in a building, at least one of on/off time of each air-conditioning equipment, set temperature change, a room temperature of each room, an outdoor temperature and accumulated operation time for each period of time and/or each day of each building (facility) for which observation has already been started is registered as a use pattern case. The use pattern case is not specifically limited because a use pattern depends on the type of a subject facility or equipment that is a subject for the simulator 1. Examples of a use pattern when performing a simulation for a building are listed on, e.g., the page at the following URL of the U.S. Department of Energy (DOE). http://www.energycodes.gov/commercial-prototype-building-models The use pattern scenario predictor 15 searches the use pattern case register 17 for a case similar to a current usage status of subject equipment that is subject to evaluation, and predicts a future usage status. For the similar case searching, in some cases, a degree of similarity to the case is calculated and a case is selected according to the degree of similarity. Then, assuming that a usage status that is the same as the usage status of the subject equipment in the searched case will continues in the future, a future usage state may be predicted.

A method for calculation of the degree of similarity may be, for example, a method in which the aforementioned feature values of each case, for example, equipment operation time in each season, an average value of set temperatures and an average value of outdoor temperatures, are recorded as index information, and a case having feature values whose distance to feature values of the equipment that is subject to evaluation, the feature values being calculated from the measurement data recorded in the measurement data storage 12, is not larger than a threshold value is searched for. More specifically, the method may be a method in which a distance between vectors including the respective items as components is not larger than a threshold value is searched for. Here, the method of calculation of the degree of similarity depends on the type of the subject facility or equipment that is a subject for the simulator 1 and thus is not specifically limited here.

The performance change predictor 14 searches for a similar case from the model parameter case storage 19 based on the index information, using the future usage status predicted by the use pattern scenario predictor 15 as a search key, and predicts a way of change of deterioration (or failure) of the equipment relative to time, in the form of a chronological probability density distribution. If the index information of the model parameter case includes minimum items only, it is possible to search for a use pattern case and search for a model parameter case corresponding to the use pattern case.

The simulation evaluator 5 performs a simulation using the simulator 1 after the user setting conditions for simulation evaluation. Also, the simulation evaluator 5 performs an evaluation simulation of an equipment replacement plan using the future use pattern of the equipment that is subject to evaluation, the future use pattern being predicted by the use pattern scenario predictor 15, an equipment replacement timing (described later) that is, e.g., designated by the user, and a performance change pattern of the equipment that is subject to evaluation, the performance change pattern being predicted by the performance change predictor.

The simulation evaluator 5 includes a replacement timing designator 6, an evaluation metric selector 7 and an evaluation result display 8.

The replacement timing designator 6 sets a replacement timing of an equipment that is subject to evaluation. For the replacement timing, a value designated via the terminal 9 is used. The designated replacement timing is used as a part of conditions for evaluation simulation in the simulator 1 (which is different from a simulation for probability density distribution estimation).

The evaluation metric selector 7 determines an evaluation metric for performing an evaluation simulation. The evaluation metric is one that determines a condition for replacement of the equipment, and may be selected from a plurality of evaluation metrics. The evaluation metric selector 7 may use an evaluation metric designated or selected via the terminal 9 or may uses one given in advance. Examples of the evaluation metric include, e.g., one based on an average value, an X percent point at the top and/or an X percent point at the bottom and accumulated operational costs calculated from, e.g., power consumption. The evaluation metric may be one other than the above examples.

The evaluation result display 8 displays a simulation result obtained from the simulation evaluator 5.

Figure 7A:
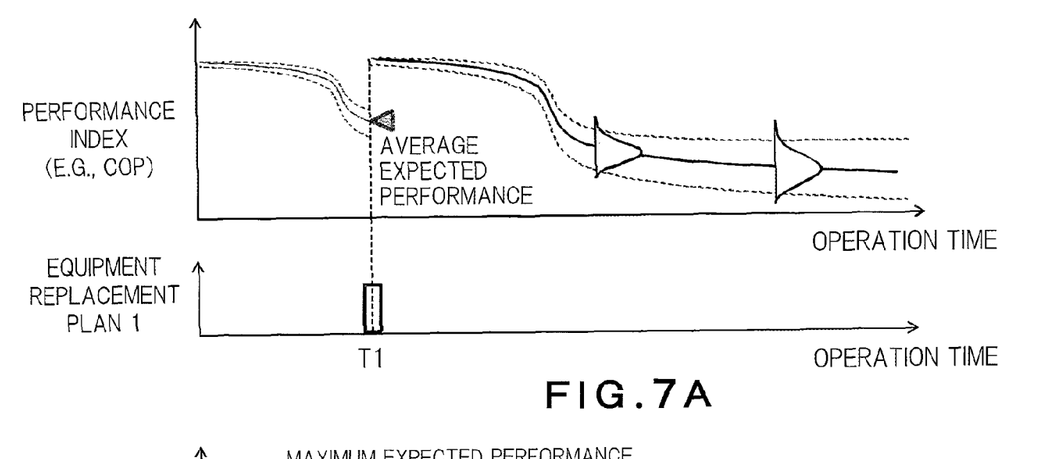
FIGS. 7A and 7B are diagrams illustrating an example of evaluation and comparison of equipment replacement plans.
Figure 7B:
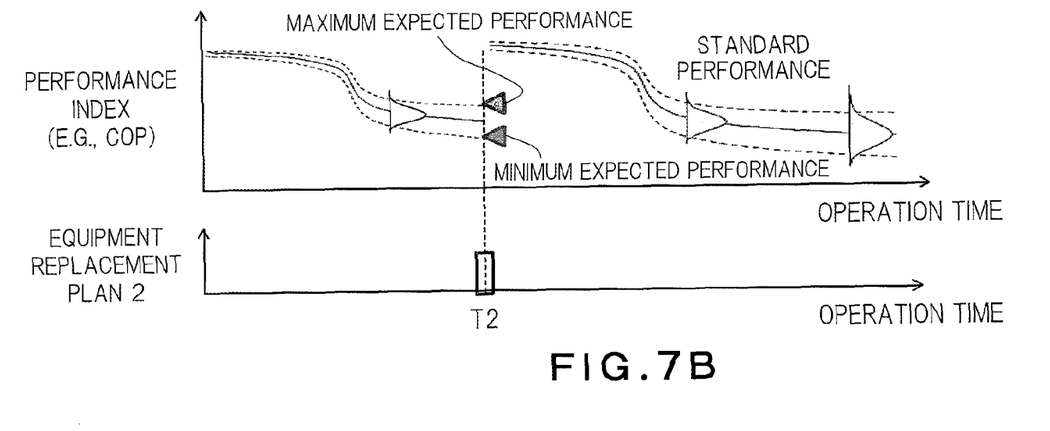

FIGS. 7A and 7B illustrate an example of evaluation and comparison of equipment replacement plans. On the respective upper sides of FIGS. 7A and 7B, the abscissa axis represents operation time and the ordinate axis represents performance index (here, COP). On the respective lower sides of FIGS. 7A and 7B, the abscissa axis represents operation time and the ordinate axis represents replacement timing. Each of the origins is a current time.

In FIG. 7A, change in performance of an equipment that is subject to evaluation from the current time is indicated in the form of temporal transition of a probability density distribution. At a timing T1 before variation of an expected performance index (COP) becomes larger, replacement of the equipment is performed (plan 1), whereby the performance is initialized. This is, e.g., a case where the evaluation metric for the timing T1 stipulates that replacement is performed if the average value (average expected performance) is not larger than a threshold value. In this example, it is assumed that the equipment is replaced with an equipment of the same type and a usage status is the same after the replacement. In other words, on such assumption, at the timing T1 onwards, change in performance of the equipment is displayed in the form of temporal transition of a probability density distribution. However, if there are a similar case in the use pattern case storage 18 or the model parameter case storage 19, this example can be employed even for a case where the equipment is replaced with an equipment of a different type and a usage status after the replacement is different (for example, the tenant is different).

In the example of plan 2 in FIG. 7B, a timing for equipment replacement is later than that in plan 1, and replacement is performed at the timing T2. This is, e.g., a case where the evaluation metric for the timing T2 stipulates that replacement is performed if the X percent point at the top (maximum expected performance) is not larger than a threshold value. The maximum expected performance at the replacement timing T2 in plan 2 is nearly equal to the average expected performance at the replacement timing T1 in plan 1. Since the replacement timing T2 is later than the replacement timing T1, the variation of the expected performance is larger. If a plan is formed based on an optimistic assumption that the plan may be employed if the maximum expected performance is good, an evaluation that allows employment of both plan 1 and plan 2 can be made.

Figure 8A:
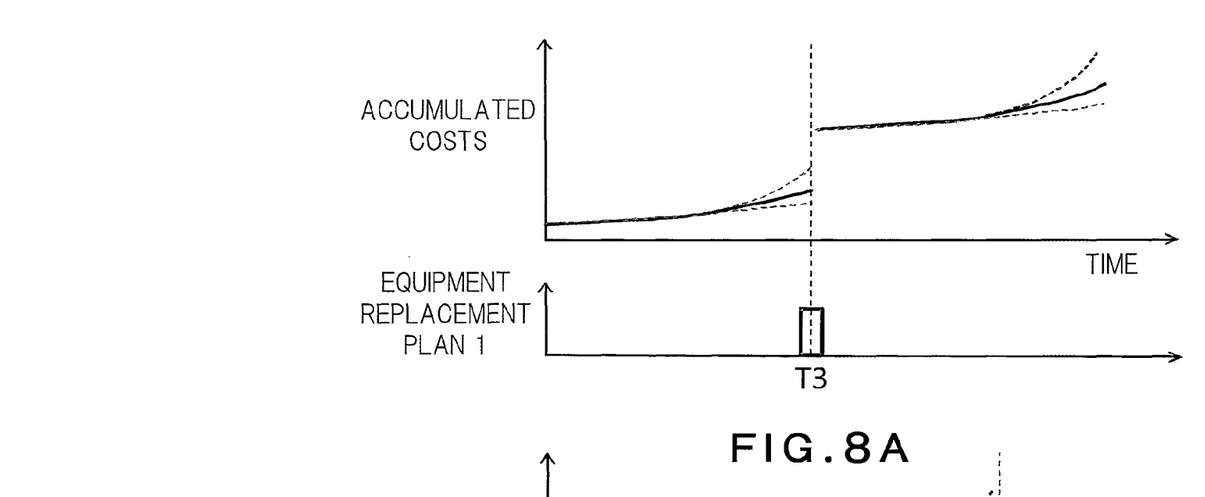
FIGS. 8A and 8B are diagrams illustrating an example of evaluation and comparison of equipment replacement plans using a simulator and a simulation evaluator.
Figure 8B:
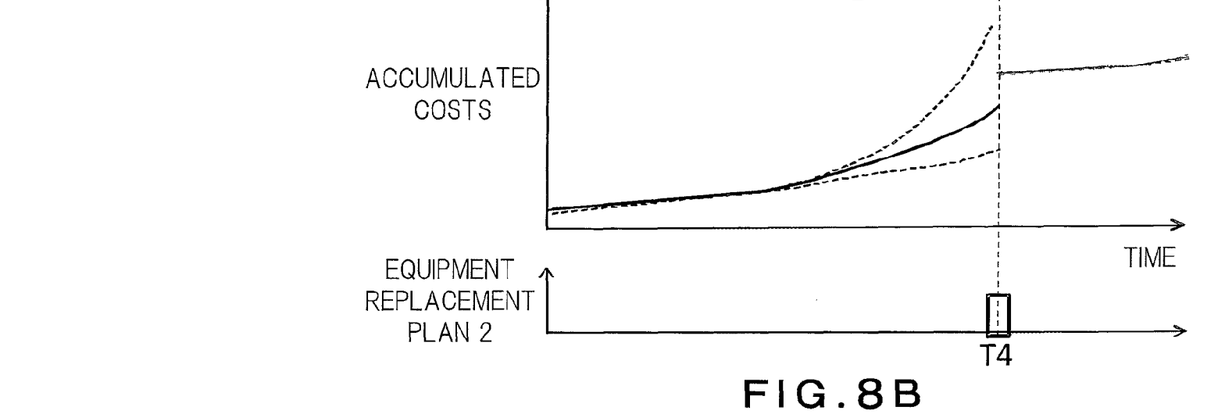

FIGS. 8A and 8B indicate an example of evaluation and comparison of an equipment replacement plan using the simulator 1 and the simulation evaluator 5.

The upper side of FIG. 8A indicates an example in which provisional calculation of costs relative to time is performed by means of simulation, with the accumulated costs of the equipment as the ordinate axis and the operation time as the abscissa axis. The solid line represents an average value, the upper dashed line represents an X percent point at the top and a lower dashed line represents an X percent point at the bottom. The accumulated costs of the equipment include a cost for replacement and an operational cost. On the lower side of FIG. 8A, the abscissa axis represents operation time and the ordinate axis represents an equipment replacement timing. At a timing T3, replacement of the equipment is performed (plan 1).

FIG. 8B indicates the case of plan 2, and a timing T4 for replacement of the equipment in plan 2 is later than the replacement timing T3 in plan 1. Since increase in operational cost such as a power consumption accelerates with performance degradation, it is indicated that the accumulated costs in plan 2 can be larger than those of plan 1.

Figure 9:
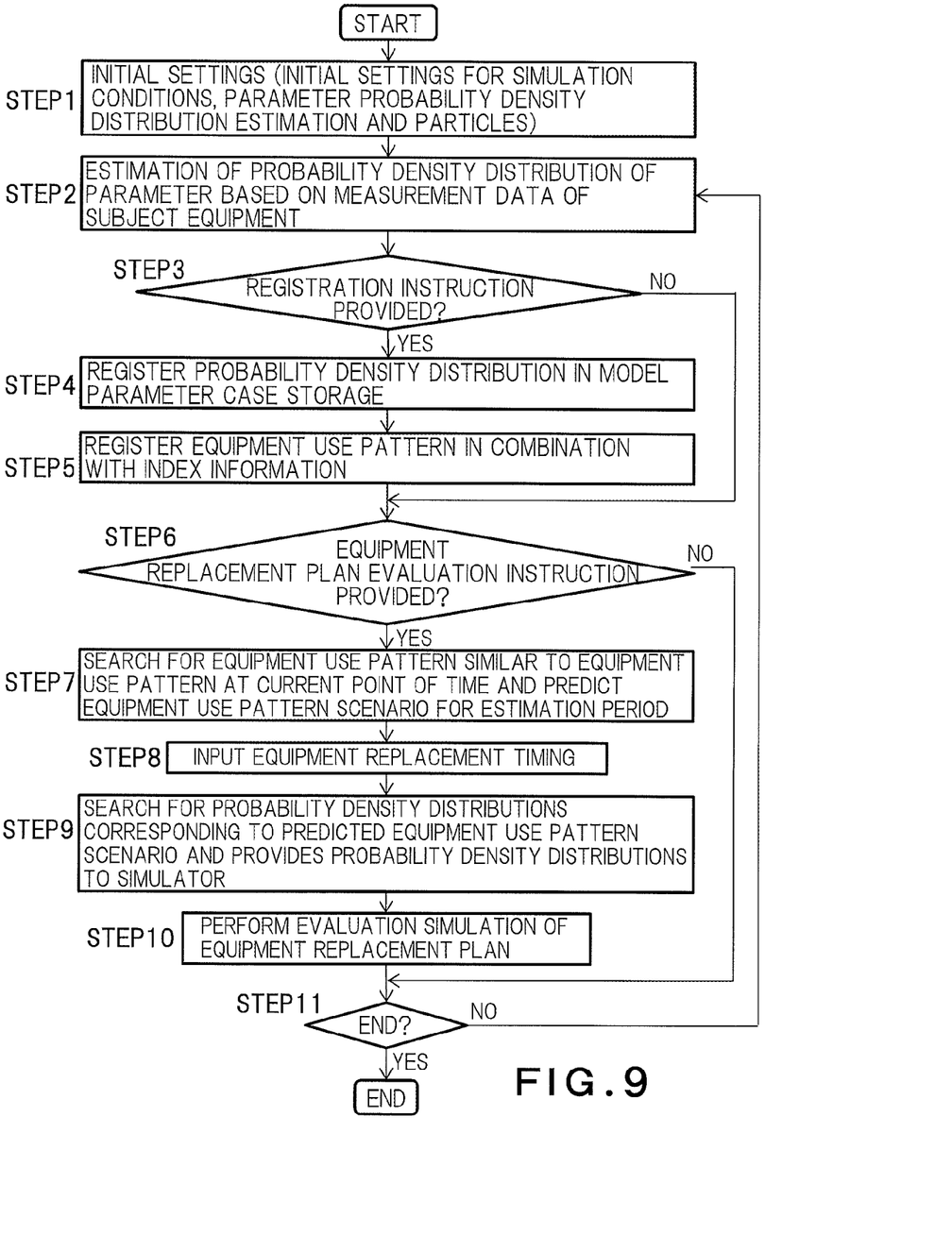
FIG. 9 is a flowchart of overall processing in the equipment evaluation system.

FIG. 9 is a flowchart of overall processing in the present system.

In step 1, initial settings are made for simulation conditions by the simulation evaluator 5. Also, for subject equipment, one or more parameters to be estimated are selected. Besides that, e.g., initial settings for particles may be made.

In step 2, in the model performance parameter estimator 11, using the simulator 1 and the simulation evaluator 5, a probability density distribution of values of each parameter set in step 1 by means of a known method such as a particle filter estimated.

In step 3, whether or not there is an instruction for case registration (a model parameter case and a use pattern case) from the terminal 9 is determined, and if there is such instruction, the processing proceeds to step 4, and if there is no such instruction, the processing proceeds to step 6. In other words, registration of a case is performed only if there is an instruction to do so from the user.

In step 4, the probability density distribution of each parameter, which is estimated in step 2, is registered as a model parameter case in the model parameter case storage 19, together with index information for searching.

In step 5, data indicating a usage status of the subject equipment (e.g., accumulated operation time) is linked to the index information and registered as a use pattern case in the use pattern case storage 18.

In step 6, whether or not there is a request to perform evaluation of an equipment replacement plan for a new equipment that is subject to evaluation from the terminal 9 is determined. If there is such request, the processing proceeds to step 7, and if there is no such request, the processing proceeds to step 11.

In step 7, the use pattern scenario predictor 15 searches for a use pattern similar to a user pattern at a current point of time of the new equipment that is subject to evaluation, from the use pattern case register 17 and predicts a future usage status.

In step 8, an equipment replacement plan, specifically, an equipment replacement timing, is input from the terminal 9 using the replacement timing designator 6.

In step 9, the performance change predictor 14 searches for a similar case from the model parameter case storage 19, using a predicted status that is a result of prediction by the use pattern scenario predictor 15 as a search key. In other words, the performance change predictor 14 predicts change in deterioration of the equipment relative to time, in the form of a probability density distribution.

In step 10, based on the future use pattern predicted in step 7, the equipment replacement timing set in step 8 and the pattern of change in performance of the equipment relative to time, which is predicted in step 9, an evaluation simulation of the equipment replacement plan is performed using the simulator 1 and the simulation evaluator 5.

In step 11, whether or not to continue the parameter estimation (probability density distribution estimation) is determined via the user terminal 9, and if the parameter estimation is not continued, the processing ends, and if the parameter estimation is continued, the processing returns to step 2.

Figure 10:
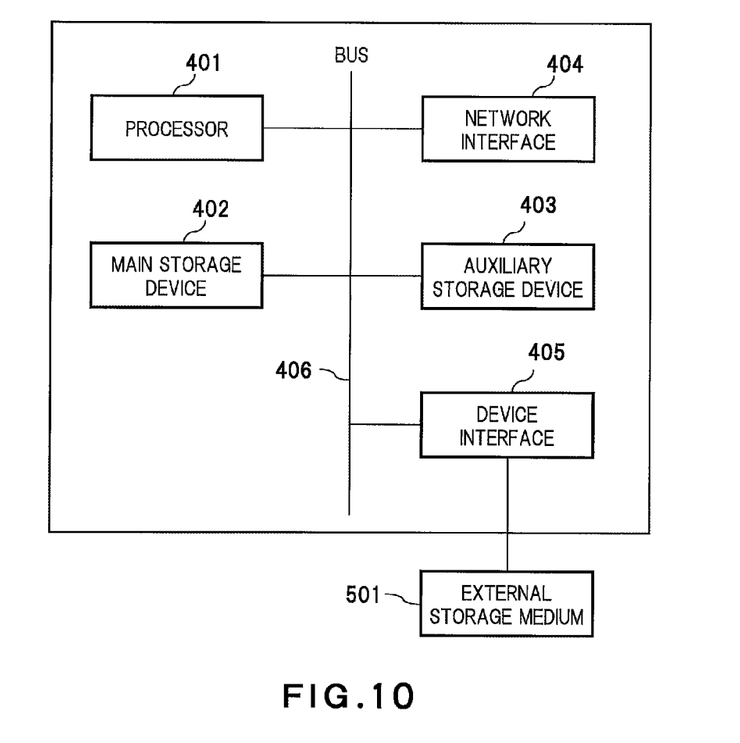
FIG. 10 is a block diagram illustrating an example of a hardware configuration according to an embodiment of the present invention.

FIG. 10 is a block diagram illustrating an example of a hardware configuration according to an embodiment of the present invention. An equipment evaluation device can be provided in the form of a computer device including a processor 401, a main storage device 402, an auxiliary storage device 403 and a communication device 404, device interface 405, which are connected via a bus 406.

The processor 401 reads a program from the auxiliary storage device 403 and develops the program in the main storage device 402 and executes the program, whereby functions of the respective blocks in FIGS. 1 and 2 can be provided.

In the equipment evaluation device according to the present embodiment, the program to be executed by the device may be provided by the program being installed in advance in the computer device or the program being stored in a storage medium such as a CD-ROM or distributed via a network and being installed in the computer device as necessary.

The network interface 404 is an interface for connection with a communication network. Communication with a terminal and communication devices in a subject facility may be provided via the network interface 404. Here, only one network interface illustrated, but a plurality of network interfaces may be included.

The device interface 405 is an interface to be connected to an equipment such as an external storage medium 501. The external storage medium 501 may be any storage medium such as an HDD, a CD-R, a CD-RW, a DVD-RAM, a DVD-R or a SAN (storage area network).

The main storage device 402 is a memory device that temporarily stores, e.g., a command to be executed by the processor 401 and various data, and may be a volatile memory such as a DRAM or a non-volatile memory such as an MRAM. The auxiliary storage device 403 is a storage device that permanently stores, e.g., programs and data, and is, for example, an HDD or an SSD. Data retained in, e.g., the storages in FIG. 1 are stored in the main storage device 402, the auxiliary storage device 403 or the external storage medium.

As described above, according to the present embodiment, utilizing measurement data acquired online from subject equipment and a simulation model of the subject equipment, a performance degradation state of the equipment over a long period of time in consideration of the entire life cycle can be predicted and an improvement plan can be formed utilizing a result of the prediction.

The present invention is not limited to the above described embodiments as they are, and constituent elements can be substantiated with deformation within a range not deviating from the gist thereof in a practical phase. Various inventions can be formed by appropriate combinations of the plurality of constituent elements disclosed in the above described embodiments. For example, some constituent elements can be deleted from all the constituent elements shown in the embodiments, and the elements across the different embodiments can be appropriately combined.

The invention claimed is:

1. An equipment evaluation system comprising a computer including a processor, comprising:
   an estimator implemented by the computer, to estimate a probability density distribution of a parameter representing performance of subject equipment based on measurement data of the subject equipment, the measurement data resulting from a measurement performed at each of a plurality of times;
   an acquirer implemented by the computer to acquire a use pattern of the subject equipment;
   a hardware storage to store the use pattern in association with the probability density distribution for the subject equipment; and
   an evaluator implemented by the computer to identify a use pattern of the subject equipment, the use pattern being similar to a use pattern of a first equipment that is different from the subject equipment, and evaluating future performance degradation of the first equipment using probability density distributions corresponding to the identified use pattern.

2. The equipment evaluation system according to claim 1, wherein the evaluator receives information designating a replacement timing for the first equipment, identifies a use pattern of the subject equipment, the use pattern being similar to an expected use pattern of a new equipment with which the subject equipment is to be replaced at the replacement timing, and evaluates future performance degradation of the new equipment at and after the replacement timing using probability density distributions corresponding to the identified use pattern.

3. The equipment evaluation system according to claim 2, wherein the evaluator evaluates an total of a future operational cost of the first equipment, a replacement cost of the first equipment and an operational cost of the new equipment after the replacement.

4. The equipment evaluation system according to claim 1, wherein the evaluator performs evaluation based on an average value, a predetermined percent point at a top or a predetermined percent point at a bottom of the probability density distribution.

5. The equipment evaluation system according to claim 1, wherein the estimator estimates the probability density distribution using a particle filter.

6. An equipment evaluation method performed by a computer, comprising:
   estimating a probability density distribution of a parameter representing performance of subject equipment based on measurement data of the subject equipment, the measurement data resulting from a measurement performed at each of a plurality of times;
   acquiring a use pattern of the subject equipment;
   storing, in a hardware storage, the use pattern to be associated with the probability density distribution for the subject equipment; and
   identifying a use pattern of the subject equipment, the use pattern being similar to a use pattern of a first equipment that is different from the subject equipment, and evaluating future performance degradation of the first equipment using probability density distributions corresponding to the identified use pattern.

7. A non-transitory computer readable medium having a program stored therein which when executed by a computer, to cause the computer to perform processing comprising:
   estimating a probability density distribution of a parameter representing performance of subject equipment based on measurement data of the subject equipment, the measurement data resulting from a measurement performed at each of a plurality of times;
   acquiring a use pattern of the subject equipment;
   storing, in a hardware storage, the use pattern to be associated with the probability density distribution for the subject equipment; and
   identifying a use pattern of the subject equipment, the use pattern being similar to a use pattern of a first equipment that is different from the subject equipment, and evaluating future performance degradation of the first equipment using probability density distributions corresponding to the identified use pattern.

* * * * *